United States Patent [19]
Hansen

[11] 3,825,283
[45] July 23, 1974

[54] ADJUSTABLE LINK WITH LOCKING WRENCH FOR A TRACTOR THREE-POINT HITCH

[75] Inventor: Kenneth N. Hansen, Waukesha, Wis.

[73] Assignee: Allis-Chalmers Corporation, Milwaukee, Wis.

[22] Filed: June 4, 1973

[21] Appl. No.: 366,869

[52] U.S. Cl............. 280/461 A, 81/180 R, 151/44, 172/439
[51] Int. Cl............................................ B60d 1/14
[58] Field of Search............... 280/461 A; 85/32 W; 151/44, 54; 81/180 R, 125.1, 121 R; 172/439

[56] References Cited
UNITED STATES PATENTS

| | | | |
|---|---|---|---|
| 3,053,552 | 9/1962 | Horney | 280/461 A |
| 3,371,945 | 3/1968 | Adams | 280/461 A |
| 3,731,951 | 5/1973 | Gruenberger | 280/461 A |

FOREIGN PATENTS OR APPLICATIONS

| | | | |
|---|---|---|---|
| 747,256 | 9/1944 | Germany | 151/44 |

Primary Examiner—Leo Friaglia
Attorney, Agent, or Firm—Arthur L. Nelson

[57] ABSTRACT

An adjustable link of a three-point hitch on a tractor for adjustably raising and lowering the lower draft arms or extending the upper link of a three-point hitch. A wrench member is carried on the link to adjust the length of the link and lock the link at its adjusted length.

10 Claims, 10 Drawing Figures

PATENTED JUL 23 1974 3,825,283

ADJUSTABLE LINK WITH LOCKING WRENCH FOR A TRACTOR THREE-POINT HITCH

This invention relates to a three-point hitch on a tractor and more particularly to an adjustable link having a threaded member for adjustably changing the length of the link. A wrench member has a double socket whereby in a first position one socket engages the threaded member to adjust the link, and in the second position the other socket engages the threaded member to lock the link in the adjusted position.

A three-point hitch is in common usage for coupling an implement to a tractor. A three-point hitch generally includes a pair of rock arms mounted on a rock shaft which is hydraulically operated to raise and lower the rock arms which carry two lift links pivotally connected between the rock arms and the two lower draft arms. The two lower draft arms and the upper link are universally connected on their forward ends to the tractor. The two lower draft arms and the upper link are connected through complementary connections to the implement to provide a coupling between the tractor and the implement. The implement position is controlled from the tractor through the two lower draft arms and the upper link. Individual adjustment of the draft arms is made through the lift links. Conventional lift links include a turnbuckle which can be rotated to extend or contract the length of each of the lift links and thereby provide a leveling effect on the implement in a transverse direction.

Similarly, the upper link can be extended or contracted through a similar turnbuckle arrangement. The upper link provides a beaming operation on the implement and controls the leveling of the implement in the longitudinal direction. It is desirable that the turnbuckle on these links be locked in its adjusted position after the adjustment is made. Accordingly, this invention provides for a wrench member which has a first socket to receive the turnbuckle or nut for rotation to adjust the length of the link. The second socket of the wrench is at 90° to the first socket and also fits over a hexagonal periphery of the turnbuckle or nut and is fastened to a pin on the link in a locking position to prevent the turnbuckle from changing its position once the link is adjusted. Accordingly, the wrench member provides an adjustment of the winging nut on each of the lift links or a turnbuckle on the upper link to adjustably set the length of the link as desired by the operator.

It is an object of this invention to provide a winging nut on the lift links of a three-point hitch on a tractor with a wrench member for adjusting and locking the winging nut.

It is another object of this invention to provide an adjustable nut on the link of a three-point hitch whereby a member having a socket receives the nut to adjustably set the length of the link and a second socket to lock the nut when the link is in the adjusted position.

It is a further object of this invention to provide an adjustable turnbuckle on a link of a three-point hitch whereby the turnbuckle has a hexagonal periphery which is received in a socket of an adjusting member to adjust the length of the link and the adjusting member has a second socket which receives the turnbuckle and locks the turnbuckle in its adjusted position to prevent the link from changing its length once it has been adjusted.

The objects of this invention are accomplished by providing an adjusting member which is essentially a wrench having two sockets and which is mounted on an adjustable link of a three-point hitch. This adjusting member has a first socket in the handle portion of the member and which fits a hexagonal external periphery on the turnbuckle to rotate the turnbuckle to thereby extend or contract the length of the link. Once the adjustment is made the adjusting member is rotated ninety degrees whereby a second socket is then positioned on the external periphery of the turnbuckle. In this position the adjusting member is then seated on a retainer which maintains the turnbuckle in a nonrotatable position and locks the link in its adjusted position.

Referring to the drawings, the preferred embodiments of this invention are shown.

Figure 1:
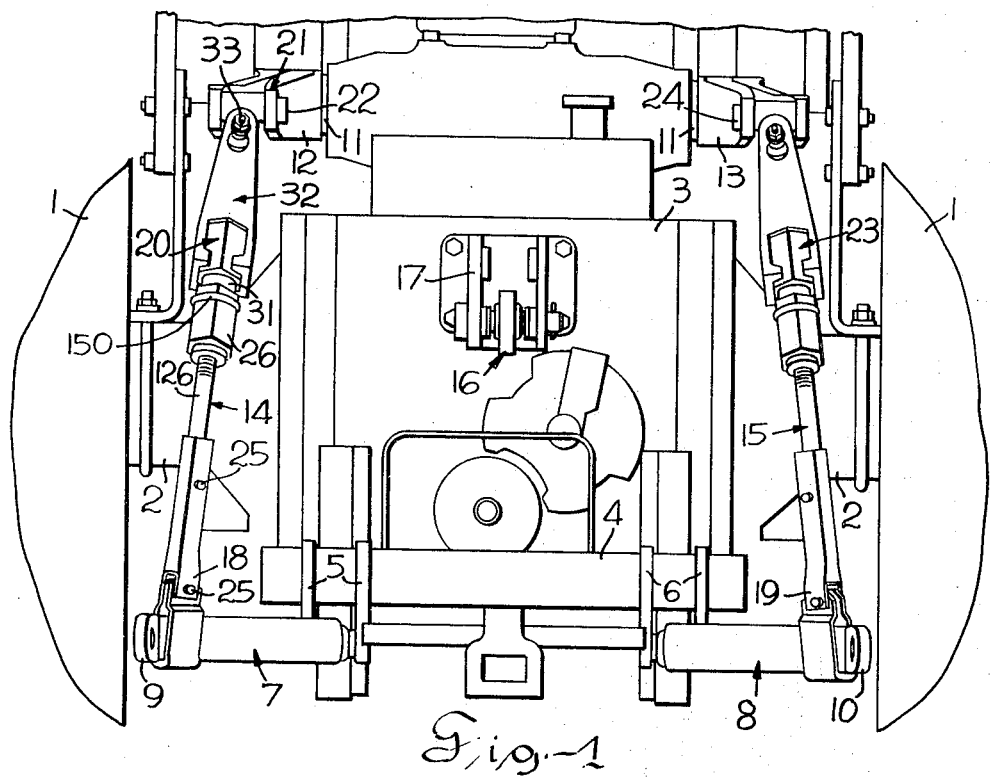
FIG. 1 illustrates the rear view of a tractor having a three-point hitch with adjustable lift links.
Figure 3:
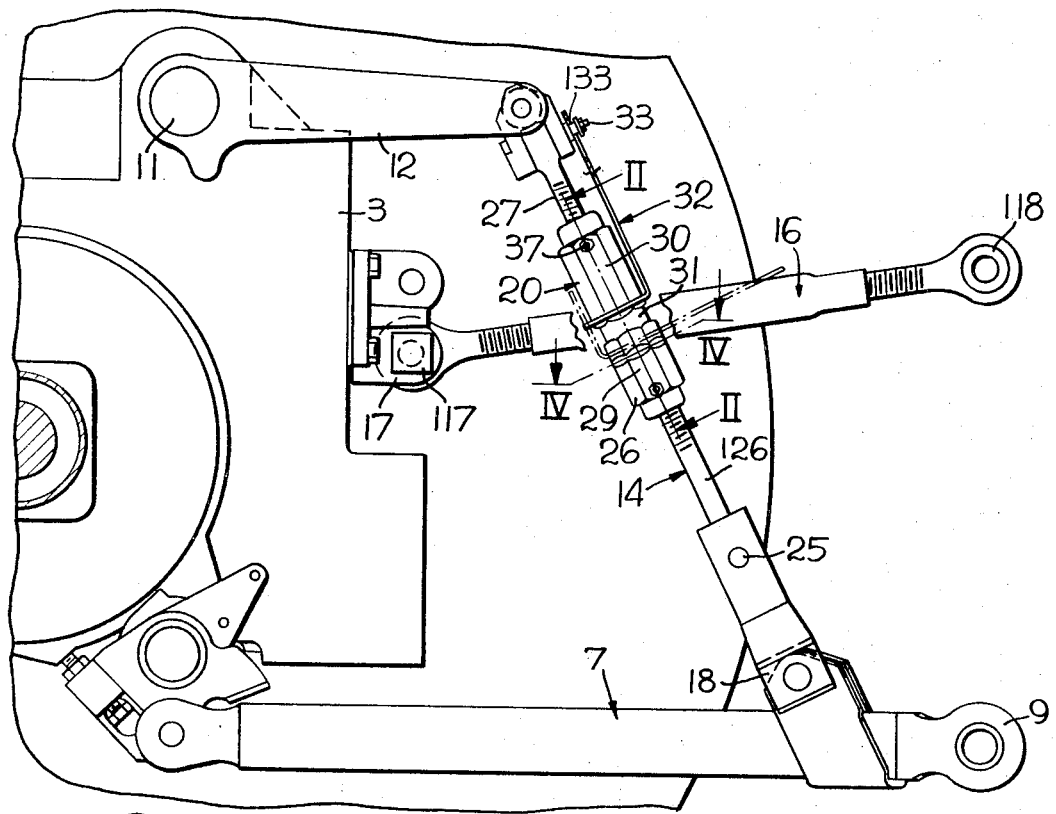
FIG. 3 is a side elevation view of a three-point hitch on a tractor.

Referring to the drawings, FIG. 1 and FIG. 3 illustrate the rear end of a tractor carrying a three-point hitch. The rear wheels 1 are driven through rear axles in the rear axle housings 2. A rear drive housing 3 provides the support for the torsion bar 4. The torsion bar 4 carries pairs of arms 5 and 6 which through pins support the lower draft arms 7 and 8. The lower draft arms 7 and 8 are provided with ends 9 and 10 adapted for connection to the implement.

A rock shaft 11 carries a pair of rock arms 12 and 13 which are each connected to an adjustable lift link 14 and 15, respectively. The lift links 14 and 15 are also pivotally connected to the lower draft arms 7 and 8 to raise and lower the draft arms by means of a hydraulic weight distribution system. An upper link 16 is pivotally mounted on the bracket 17 on the rear end housing 3 by a pin 117. The upper link 16 is provided with means 118 on its rear end adapted for connection to an implement.

The link 14 is formed with a clevis 18 on its lower end which pivotally connects to the lower draft arm 7. The lift link 15 is formed with a clevis 19 on its lower end to pivotally connect to the lower draft arm 8. A turnbuckle 20 is positioned in the lift link 14 between the pivotal connection 21 formed by the pin 22 and the rock arm 12 and the upper end of the lift link 14. Similarly, the turnbuckle 23 is carried in the lift link 15 and the link is pivotally connected on its upper end to the rock shaft 13 by the pin 24.

Since both the lift links are similarly constructed, the left lift link 20 will be described. The clevis 18 is pivotally connected by the pin 25 to the eye bolt 126 of the turnbuckle 20. Turnbuckle 20 includes a sleeve 26 having a right and left hand thread in opposiing ends. The eye bolt 27 is pivotally connected to the pin 33 on its upper end and extends into the sleeve 26 of the turnbuckle 20. As sleeve 26 is rotated on its axis, the link is adjusted. The sleeve 26 is formed with a hexagon head 29 on its lower end and a similar hexagon head 30 on its upper end. Intermediate the head 29 and 30 is a recessed area 31 for indexing the wrench member 32 when adjusting the turnbuckle 20.

Figure 2:
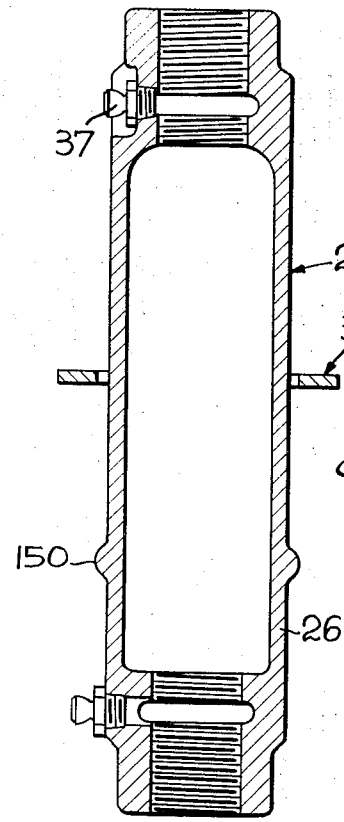
FIG. 2 is a cross-section view taken on line II—II of FIG. 3.
Figures 4, 5, 6, 7:
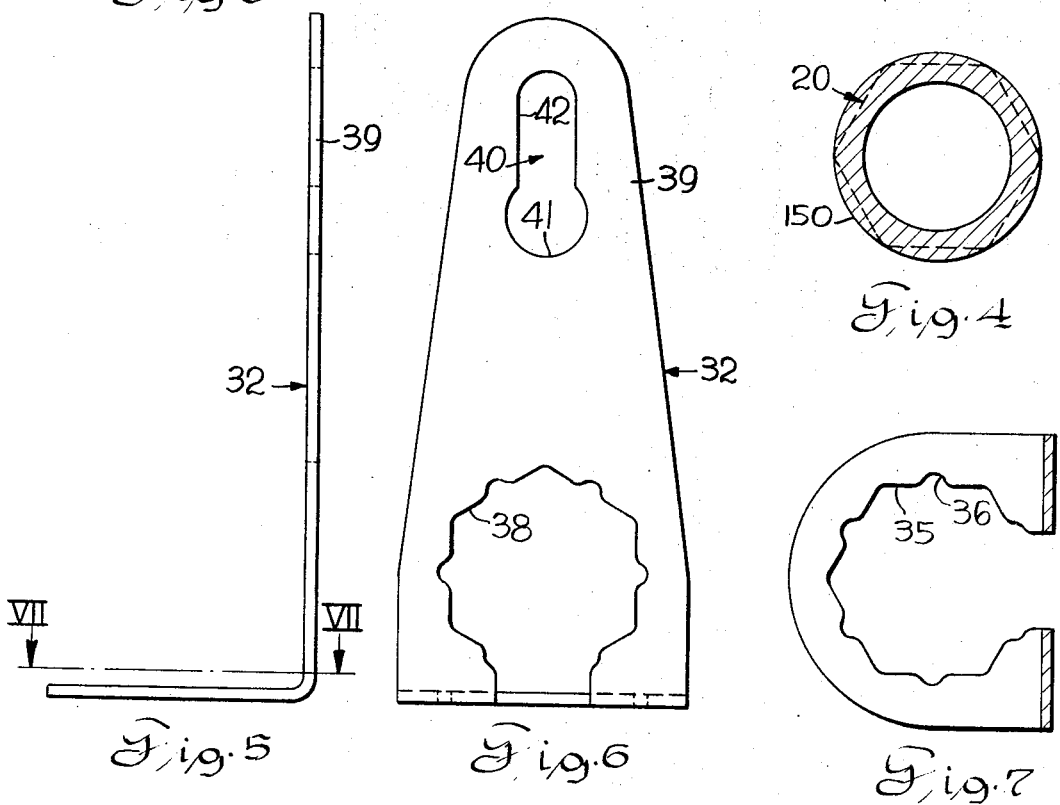
FIG. 4 is a cross-section view taken on line IV—IV of FIG. 3.
FIG. 5 is a side view of the adjusting member on the three-point hitch.
FIG. 6 is a front view of the adjusting member for the three-point hitch.
FIG. 7 is a cross-section view taken on line VII—VII of FIG. 5.

An adjusting member 32 in the form of a wrench is carried on a pin 33. The adjusting wrench member 32 is shown in the locking position on the sleeve 26 of the turnbuckle 20. The sleeve 26 is shown in section in FIG. 2 with the wrench member 32 in the locking position. Referring to FIG. 4 the turnbuckle is shown in section which shows the hexagonal peripheral surface which the wrench member 32 embraces and operates as a wrench.

Referring to FIGS. 5, 6 and 7, the socket 35 for holding sleeve 26 when the wrench member 32 is in the locking position. The recessed portions 36 provide clearance for the grease fitting 37 when the wrench member 32 is removed from the sleeve. Similarly the socket 38 is generally a hexagon shape and is received over the periphery of the sleeve 26 when the wrench member 32 is in the operating position. The handle portion 39 provides a means of rotating on a turnbuckle to adjust the length of the link.

A slot 40 has an enlarged end portion 41 to permit the wrench member to be received on the pin 33. Once the pin is received in the enlarged opening 41, it then is slipped downwardly into the upper reduced slot opening portion 42 to permanently hold the sleeve 26 of the turnbuckle 20 in its locked position.

Figure 8:
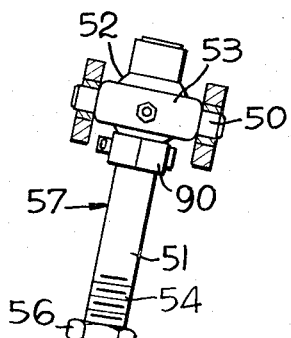
FIG. 8 is a view of a modification of the left lift link shown in FIG. 1 with the adjusting member carried at the lower portion of the link.
Figure 10:
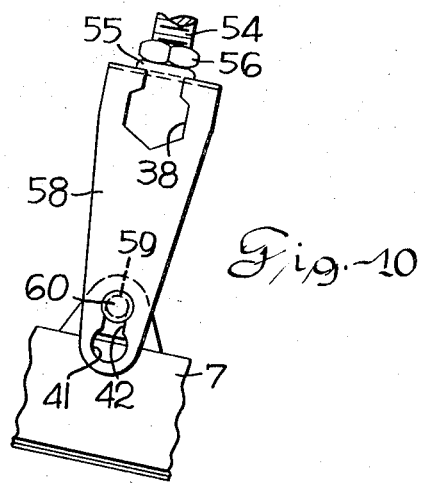
FIG. 10 is an auxiliary view of the adjusting member shown in FIG. 8.

Referring to FIGS. 8 and 10 a modification of the lift link is shown. A trunnion connection 50 is adapted for connection to one of the rock arms. The shaft member 51 extends downwardly and has a threaded lower portion 54 which is threadedly received in the sleeve 55. The lock nut 56 is locked on the threaded portion 54 when the link 57 is adjusted and locked. The wrench member 58 is seated in a recess 59 on the end of the pin 60. The sleeve 55 forms a clevis 61 on its lower end which is connected to lower draft arm support 62 which is welded to the lower draft arm 7.

Figure 9:
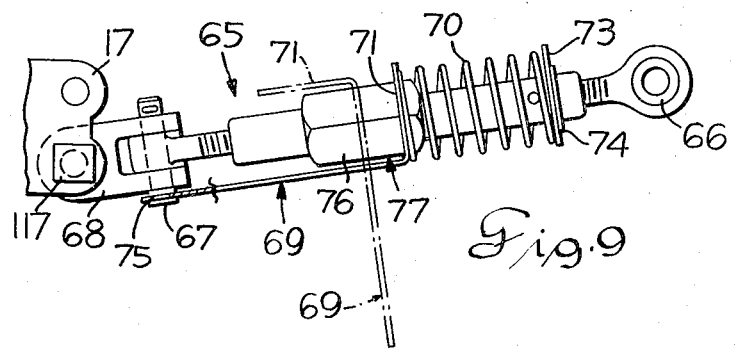
FIG. 9 is a view of a modification of the upper link shown in FIG. 3 showing a spring mounted adjusting member.
Figure 11:
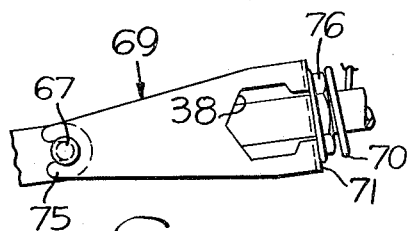
FIG. 11 is an auxiliary view of the adjusting member shown in FIG. 9.

Referring to FIGS. 9 and 11 a similar arrangement is shown on the upper link 65. The upper link 65 has a bushing 66 forming an opening on its rearward end adapted for connection to an implement. The forward end of the upper link is connected through pin 67 to the clevis 68. The clevis 68 is connected to bracket 17 by pin 117. The wrench member 69 is biased to a forward position by the spring 70. The spring 70 is compressably positioned between the right angle portion 71 of the wrench member 69 and the spring seat 73 which engages a snap ring 74. In the rest position as shown the bifurcated portion 75 seats on the pin 67 and locks the nut 76 of the turnbuckle 77 in the adjusted position of the link.

The operation of this device will be described susequently.

Referring to FIGS. 1 and 3, the three-point hitch is shown with the wrench member 32 suspended on the pin 33. When the wrench member 32 is positioned in the slot 133 of pin 33 and lowered so the pin is in the upper portion 42 of the slot 40 the socket 35 is positioned on the nut 30. This prevents the nut from rotating relative to the bolts 126 and 27 and retains the link 20 in its adjusted position.

When it is desired to adjust the link the wrench member 32 is lifted until the pin 33 is in the lower portion 41 of the slot 40 and the wrench member 32 is then pivoted outwardly and the socket 35 can be moved upwardly. When the wrench member 32 is moved upwardly beyond the nut 30 it can be rotated ninety degrees about the shank portion of the bolt 27. The socket 38 is then positioned on either nut 29 or 30 and the sleeve 26 can be rotated to extend or contract the lift link 20. The socket 38 is preferably lowered to engage head 29 to rotate sleeve 26. The peripheral ridge 150 acts as a stop to prevent the wrench member 32 from being lowered beyond this point as the sleeve 26 is rotated. The wrench member 32 may be raised to the recess 31 for counterrotation in adjusting the turnbuckle 20. When the link is adjusted to its desired length the wrench is again rotated 90° and repositioned with socket 35 on the nut 30 and the pin 33 is again slid into the slot 40 of wrench member 32 as shown in FIG. 3.

Referring to FIG. 8 a similar arrangement is shown, however, the wrench member 58 is formed with the slot portion 42 positioned upwardly in the handle portion from the enlarged portion 41 and is held in the slot 59 of pin 60. The lock nut 56 is locked against the sleeve 55 as a lock nut to maintain the link 57 in its adjusted position.

When it is desired to adjust the length of the link 57 the wrench is slipped off a pin 60 and moved upwardly to the rod portion 51 and rotated ninety degrees. The socket 38 is then positioned on the nut 56 and the nut is loosened to permit adjustment of the link 57. The wrench member 58 is then moved upwardly to the nut 90 on the shaft member 51 and is then rotated to provide the desired length of the link. When this adjustment is made the lock nut 56 is again tightened and the wrench member 58 is reseated in the position as shown in FIG. 8.

Referring to FIG. 9 the wrench member 69 is positioned on the link. When it is desired to adjust the length of the upper link 65 the wrench member is pressed against the spring 70 to compress the spring and allow the bifurcated portion 75 to be removed from the pin 67. When the bifurcated portion 75 is removed from the pin 67 the wrench is allowed to slide toward the clevis 68 and is then rotated ninety degrees. The socket 38 is then positioned on the sleeve 76 and the sleeve 76 of the turnbuckle 77 is rotated to adjust the length of the upper link. When the upper link is adjusted the wrench member is then reseated in the position shown on FIG. 9.

The embodiments of the invention in which an exclusive property or privilege is claimed are defined as follows:

1. A three-point hitch having an adjustable link comprising, a three-point hitch including an adjustable link including a first threaded member, a second threaded member threadedly engaging said first threaded member, a head on said first threaded member, an adjusting wrench member having at least one complementary socket for receiving said head and rotating said first threaded member when engaged in said socket to adjustably vary the length of said link, a retainer means on said link carrying said wrench member when said link is locked in its adjusted position.

2. A three-point hitch having an adjustable link as set forth in claim 1 wherein said link defines an upper link of a three-point hitch.

3. A three-point hitch having an adjustable link as set forth in claim 1 wherein said link defines a lift link of a three-point hitch.

4. A three-point hitch having an adjustable link as set forth in claim 1 including a third threaded member threadedly engaging said first threaded member and defining a turnbuckle for adjusting the length of said link.

5. A three-point hitch having an adjustable link as set forth in claim 1 wherein said threaded members include two externally threaded members, a threaded sleeve threadedly engaging said two externally threaded members to thereby provide a means for adjusting the length of said link.

6. A three-point hitch having an adjustable link as set forth in claim 1 wherein said head defines a hexagon head, said wrench member defines a hexagon socket.

7. A three-point hitch having an adjustable link as set forth in claim 1 wherein said wrench member defines two sockets, said wrench member defines a right angle bend wherein said sockets are formed on each side of the right angle bend.

8. A three-point hitch having an adjustable link as set forth in claim 1 wherein said wrench member defines a socket for receiving said head of said first threaded member for adjusting said link, said wrench member defines a second socket for engaging said head of said first threaded member for locking said second threaded member on said link and fixing the adjusted length of said link.

9. A three-point hitch having an adjustable link as set forth in claim 1 wherein said head defines a hexagon-shaped head, a raised portion on said hexagonal head about the periphery of said head to prevent said wrench from moving axially on said link beyond a predetermined point.

10. A three-point hitch having an adjustable link as set forth in claim 1 including a turnbuckle wherein said threaded members, including a sleeve, a pair of eye bolts defining externally threaded members threadedly engaging said sleeve to thereby provide adjustment of said adjustable link.

* * * * *